INVENTOR
KATSUMI OHTSUKA

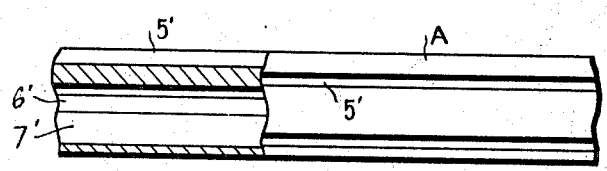
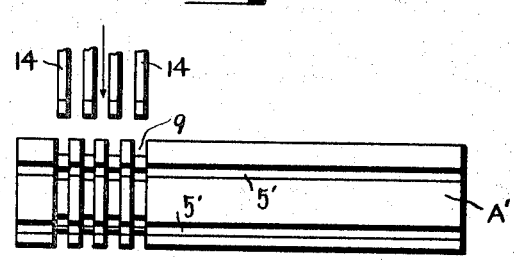
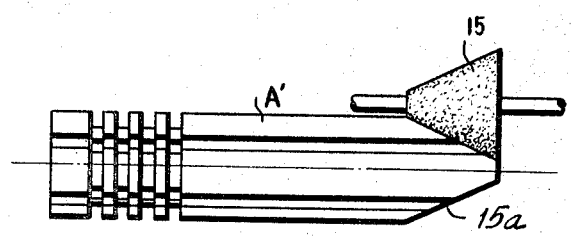
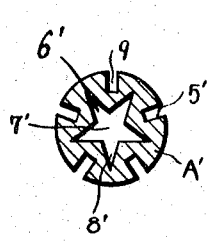 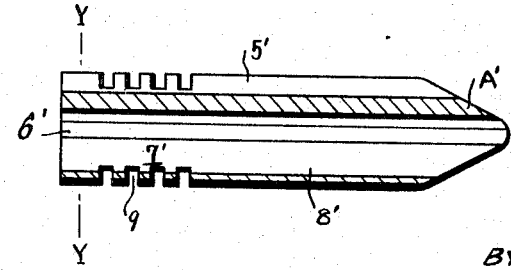 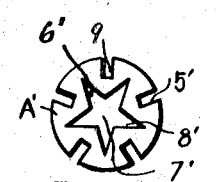

United States Patent Office
3,538,208
Patented Nov. 3, 1970

3,538,208
METHOD OF MAKING PEN WICKS OF A
SYNTHETIC RESIN
Katsumi Ohtsuka, Funabashi, Japan, assignor to The
Teikoku Hat Mfg. Co., Ltd., Hamamatsu, Shizuoka
Prefecture, Japan
Filed May 24, 1968, Ser. No. 731,787
Claims priority, application Japan, Oct. 2, 1967,
42/63,217
Int. Cl. B29c 17/10; B29f 3/00
U.S. Cl. 264—89                                  5 Claims

ABSTRACT OF THE DISCLOSURE

The method of making pen wicks from a synthetic resin comprising the steps of heating the synthetic resin to a temperature between its thermal deformation and melting temperatures, extruding the resin in a tubular form having an outside diameter at least several times greater than the final diameter of the pen wick, forming longitudinally extending grooves in the interior and exterior surface of the tubular member as it is extruded, injecting a fluid into the interior of the tubular member as it is extruded, stretching the tubular member while maintaining it between its thermal deformation and melting temperatures until it is reduced in diameter to the desired diameter of the pen wick, cutting the tubular member into desired lengths, shaping a conical end on one end of each length and cutting circumferential grooves in the opposite end of each cut length, and air curing the cut lengths.

SUMMARY OF THE INVENTION

This invention is directed to a method of making a pen wick from a synthetic resin and, more particularly, it is directed to a method of extruding the pen wick at a diameter considerably greater than its final diameter and with longitudinally extending grooves formed in both its interior and exterior surface during the extrusion step. In addition, the longitudinally extending grooves in the interior surface provide a star-shaped transverse section to the extruded member.

In the past, considerable difficulty has been encountered in attempting to form a small star-shaped cross section passage through an extruded section of synthetic resin for use as pen wicks.

Accordingly, it is a primary object of the present invention to form a tubular extruded member for use as a pen wick which is provided with a star-shaped cross section passageway.

Another object of the invention is to provide a method for extruding a length of synthetic resin with properly shaped longitudinally extending grooves formed in its interior and exterior surfaces.

Further, as extruded the tubular section has a diameter at least several times greater than the final diameter of the pen wick and after its extrusion the section is stretched to the desired diameter while retaining the configuration of the grooves in its interior and exterior surfaces.

Yet, another object of the invention is to provide an arrangement wherein a fluid, either a gas or a liquid, is injected into the passageway of the tubular member as it is extruded for maintaining the shape of the longitudinally extending grooves therein.

Still, another object of the invention is to provide a method for forming individual tubular pen wicks made from a synthetic resin, and having longitudinally extending grooves in both the inner and outer surfaces of each wick with a conically shaped point at one end and circumferentially extending grooves in the other. The circumferential grooves extend inwardly into the grooves in the interior surface of the wick for admitting ink into its passageway.

In the present invention synthetic resin is heated as it is passed through a supply chamber and an extrusion member to a temperature between its thermal deformation point and its melting point. At the outlet from the extrusion member the synthetic resin flows through an annular space formed between the inner surface of the passageway through the extrusion member and the outer surface of a tubular member located within the passageway. The annular space provides a die for the formation of the pen wicks. The diameter of the outlet from the extrusion member is at least several times greater than the final diameter of the pen wick. However, the opposing surfaces in the annular space at the outlet provide the longitudinal grooves required in the final configuration of the pen wick. The tubular member has a star-shaped transverse section and a flow passageway extends through its interior for providing a flow of gas or liquid at the outlet from the extrusion member for properly retaining the shape of the grooves in the interior passageway of the pen wick.

After the tubular section of the synthetic resin is extruded, it is stretched by a pulling action to reduce its diameter to that required for the pen wick. During the stretching operation, it retains the configuration of the longitudinal grooves in both its interior and exterior surface. After stretching, the tubular section is cut into individual lengths for pen wicks, and each length is ground at one end to provide it with a conical shape while its other end is provided with circumferentially extending grooves which are cut a sufficient distance into the wall of the pen wick to provide openings into the interior longitudinally extending grooves.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

FIG. 3 is a side view, partly in section, of a tubular section extruded from the apparatus shown in FIG. 1 and stretched to provide the section with its final outside diameter;

FIG. 4 is a side view of a cut length of the extruded member shown in FIG. 3 with circumferential grooves formed at one end;

FIG. 5 is a view similar to that shown in FIG. 4 with a grinding member providing a conically shaped end on the cut length of the extruded member;

FIG. 6 is a sectional view of the length of extruded member shown in FIG. 5;

FIG. 7 is an end view of the member shown in FIG. 6; and

FIG. 8 is a cross sectional view of the member shown in FIG. 6 taken along line Y—Y.

DETAILED DESCRIPTION OF THE INVENTION

Figure 1:
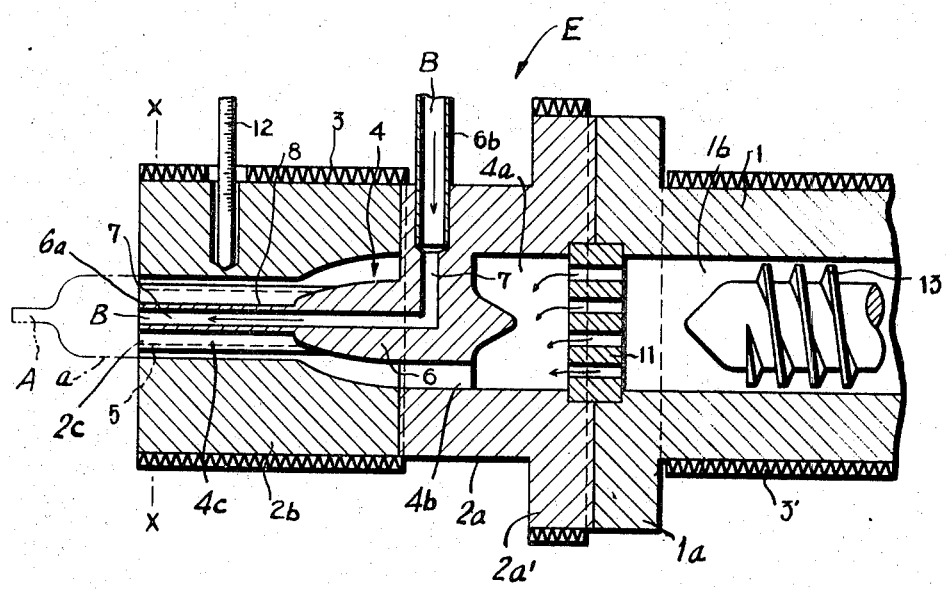
FIG. 1 is a side view, partly in section, of an apparatus for forming a pen wick according to the present invention.
Figure 2:
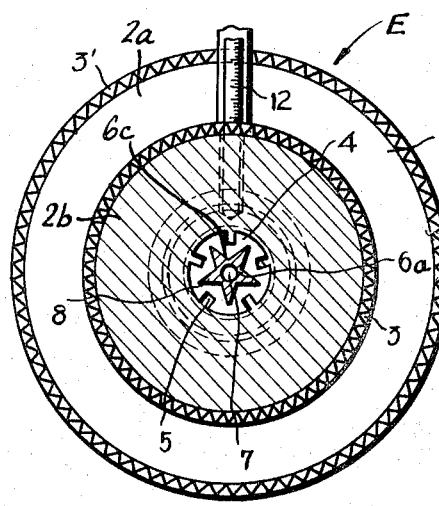
FIG. 2 is a transverse view, partly in section, taken along line X—X in FIG. 1.

In FIGS. 1 and 2 an apparatus E is shown for extruding a tubular section of a synthetic resin to form pen wicks. The apparatus E is formed of a supply chamber member 1, an intermediate extrusion section 2a, and an extrusion outlet section 2b. The supply chamber member 1 has a flange section 1a which is connected to a similar flange section 2a' on the intermediate extrusion section. At its opposite end the intermediate extrusion section 2a is connected to the extrusion outlet section 2b. Extending peripherally about the supply chamber member 1, the intermediate extrusion section 2a, and the extrusion outlet section 2b are heaters 3, 3' for maintaining a temperature within the extrusion apparatus E at a point between the thermal deformation temperature and the melting temperaure of the synthetic resin.

The supply chamber 1 has a chamber 1b containing an extruding screw 13. The intermediate extrusion section 2a and the extrusion outlet section 2b are arranged to form a continuous longitudinally extending passageway 4 aligned with the chamber 1 divided into an inlet section 4a, an intermediate section 4b and an extrusion outlet section 4c. A strainer plate 11 is positioned between the chamber 1b of the supply chamber member 1 and the inlet section 4a of the passageway 4. The wall of the intermediate section 4b of the passageway converges between the inlet section and the outlet section. The outlet section 4c has a diameter at least several times greater than the final diameter of the pen wick being formed, as an example, the diameter of the outlet section 4c of the passageway 4 has a diameter of approximately 10 mm. while the final outside diameter of the pen wick is approximately 1.2 mm.

Secured to the intermediate extrusion section 2a is a central tube 6 which extends axially through the intermediate section 4b and outlet section 4c of the passageway 4. Within the intermediate section of the passageway the central tube 6 provides an annular space with the opposite surfaces of the passageway for flowing the synthetic resin from the inlet section 4a to the outlet section 4c. As it approaches the outlet section 4c the outer surface of the central tube 6 has a reduced diameter and for the extent of its length through the outlet section 4c the central tube 6 has a part 6a having a star-shaped cross section. A flow passage 7 is provided through the central tube 6 and extends from the outlet end 2c of the extrusion member to a point within the intermediate extrusion section 2a where it makes a right bend and is connected to an inlet conduit 6b.

Within the outlet section 4c of the passageway 4 longitudinally extending projections are provided on the extrusion outlet section 2b extending radially inwardly into the passageway. The projections 5 have a rectilinear shape and are equiangularly spaced about the surface of the passageway. It will be noted in FIG. 2 that the projections 5 are spaced opposite the roots of V-shaped grooves 6c provided by the star-shaped cross section of the central tube 6.

A thermometer 12 is positioned within the wall of the extrusion outlet section 2b for controlling the temperature of the synthetic resin as it passes through the flow passageway 4.

In the method of extruding tubular lengths a of synthetic resin for making pen wicks, the synthetic resin is charged into the chamber 1b of the supply chamber member 1 wherein it is heated to a point between the thermal deformation temperature and the melting temperature of the material. The extrusion screw 13 forces the material through the strainer plate 11 into the inlet section 4a of the passageway 4 through the extrusion member. Within the extrusion sections 2a, 2b the heating elements continue to maintain the temperature of the synthetic resin between its thermal deformation point and its melting point for proper extrusion. From the inlet section the synthetic resin flows through the intermediate section 4b and then into the outlet section 4c of the passageway. Within the outlet section 4c exterior and interior grooves are formed in the synthetic resin by means of the inwardly directed projections 5 and the V-shaped grooves 6c formed on the outer surfaces of the central tube 6. As mentioned previously the diameter of the passageway 4c is at least several times greater than that of the finished diameter of the pen wicks.

The annular space between the part 6a of the central tube 6 and the opposite surface of the passageway 4 in the extrusion outlet section 2b provide a die for extruding the resin from the outlet end 2c. The diameter of the extruded section a is shown in phantom lines in FIG. 1 as it exits from the outlet end 2c. A fluid B is supplied through the conduit 6b into the passageway 7 which delivers the fluid into the extruded tubular section a at the outlet end 2c of the extrusion apparatus E. The fluid B supplied through the flow passage 7, may be compressed air or another suitable fluid, either a gas or a liquid, having a high thermal decomposition or boiling point. The fluid B issues from the outlet end of the flow passage 7 at a pressure slightly lower than that with which the synthetic resin is extruded for retaining the grooves formed in the synthetic resin by the V-shaped grooves 6c in the exterior surface of the central tube 6. The pressure exerted by the fluid flowing through the fluid passage 7 may be, for example, about 0.3 atmospheric pressure. The synthetic resin material being extruded may be polycarbonate, Teflon, or similar material.

After the extruded section a leaves the extrusion apparatus E it is gripped by some means not shown, and it is pulled in a straight line in alignment with the direction of the extrusion operation and is stretched until its outside diameter is reduced to the final outside diameter of the pen wick A to be formed. As indicated previously the extruded section a has a diameter of approximately 10 mm. as it leaves the extrusion apparatus and after the stretching operation the section A is reduced to an outside diameter of approximately 1.2 mm. In its reduced section as shown in the drawings FIGS. 3 through 8 the grooves formed by the projections 5 and the V-shaped grooves 6c in the central tube 6 are retained in the exterior and interior surface respectively of the extruded section.

After having been stretched to the final diameter the extruded section A is then cut into separate lengths A' for forming the individual pen wick sections. In FIG. 3 the extruded section A is shown after it has been stretched, while FIGS. 4 through 8 illustrate the cut lengths A' for forming the pen wicks.

In the next operation the cut lengths A' of the pen wicks are moved in side by side relationship, past cutting elements 14, see FIG. 4, which form a plurality of circumferentially extending grooves 9 in one end of the pen wick lengths A'. These grooves 9 are cut a sufficient depth into the wall of the lengths A' to extend into the longitudinally extending grooves in the interior of the extruded lengths, the grooves 6' being formed by the V-shaped grooves 6c in the star-shaped cross section of the central tube 6. Additionally, these circumferential grooves 9 also extend through the longitudinally extending grooves 5' located in the exterior surface of the pen wick lengths A'. The grooves 9 may be formed circumferentially or they may be provided in a spiral shape about the exterior surface of the pen wick.

Simultaneously, or immediately following the formation of the grooves 9 a grinding member 15 is placed in contact with the opposite end of the individual pen wick lengths A' and a conically shaped tip 15a is provided on the pen wick.

The configuration of the pen wick lengths A' is shown in FIGS. 6, 7 and 8 wherein longitudinally extending grooves 5' are provided in the exterior surface of the pen wick lengths and longitudinally extending V-shaped grooves are provided in the interior surface. The V-shaped grooves 6' in the interior of the pen wick provide it with a flow passage 7' having a star-shaped cross section. At one end the pen wick length has circumferentially extending grooves 9 which extend inwardly and intersect the V-shaped grooves 6' extending through the interior of the pen wick section. In addition the circumferential grooves cut through the longitudinally extending groove 5' in the exterior surface of the pen wick. The end of the pen wick opposite the one with the circumferentially extending grooves 9 has a conically shaped tip 15a.

In operation, the end of the pen wick with the circumferential grooves 9 is placed within an ink cylinder, not shown, and ink is absorbed into the pen wick passing through the grooves 9 into the inner V-shaped grooves 6'. The ink flows through both the outer and inner longitudinally extending grooves 5', 6' to its conically shaped end 15a while air is permitted to flow in the opposite direction through the flow passage 7' into the ink cylinder. This arrangement permits a continual flow of ink down to the tip 15a of the pen wick without any interruption.

In the past it had not been possible to successfully form a small star-shaped flow passage in a pen wick to afford the continuous flow of ink from the ink cylinder to the writing tip. In the present arrangement the method disclosed provides an arrangement for forming the necessary small diameter passageway through a pen wick for affording an efficient writing article. The arrangement disclosed also makes available a simple method for forming the required longitudinally extending grooves in the synthetic resin body of the pen wick and, after the extrusion operation has been completed, for reducing the extruded section to the final diameter of the pen wick.

While a specific embodiment of the invention has been shown in detail to illustrate the application of the inventive principles, it will be understood that the invention may be embodied otherwise without departing from such principles.

What is claimed is:

1. A method of making a pen wick of a selected diameter from a synthetic resin comprising the steps of heating the synthetic resin to between its thermal deformation temperature and its melting temperature, extruding the synthetic resin in a tubular form with longitudinally extending grooves formed in its exterior and interior surface and providing the extruded section with a diameter at least several times greater than the final diameter of the pen wick to be formed, injecting a fluid into the interior of the extruded member as it is extruded, stretching the extruded section while maintaining its temperature between the thermal deformation temperature and the melting temperature of the synthetic resin until the extruded section is reduced in diameter to the desired diameter of the pen wick, cutting the extruded section to the desired lengths, and forming openings through one end of the extruded section which openings extend into the longitudinally extending grooves formed within the interior surface of the extruded section.

2. A method of making pen wicks as set forth in claim 1 wherein the step of forming openings through one end of the extruded section comprises cutting circumferentially extending grooves in the exterior surface of the cut lengths of the extruded section adjacent one end thereof, the circumferential grooves cut to a sufficient depth to intersect the longitudinally extending grooves within the interior surface of said extruded section.

3. A method of making pen wick as set forth in claim 2 comprising the step of conically shaping the end of the cut lengths of the extruded section opposite the end containing the circumferentially extending grooves.

4. A method of making pen wicks as set forth in claim 1, comprising the step of air-curing the cut lengths of the extruded section.

5. A method of making pen wicks as set forth in claim 1 wherein the step of injecting the fluid into the interior of the extruded section comprises using a pressure lower than the pressure at which the synthetic resin is extruded for retaining the grooves formed in thhe interior surface of said extruded section.

References Cited

UNITED STATES PATENTS

| 2,220,221 | 11/1940 | Dalton | 264—167 |
| 2,287,282 | 6/1942 | Tousley | 264—167 XR |
| 2,940,126 | 6/1960 | Sheridan | 264—167 XR |
| 3,152,202 | 10/1964 | Murphy | 264—167 |
| 3,296,661 | 1/1967 | Moustier | 264—210 XR |
| 3,399,262 | 8/1968 | Quackenbush | 264—210 XR |
| 3,435,107 | 3/1969 | Conrad | 264—293 XR |

ROBERT F. WHITE, Primary Examiner

R. R. KUCIA, Assistant Examiner

U.S. Cl. X.R.

264—150, 151, 167, 209